UNITED STATES PATENT OFFICE.

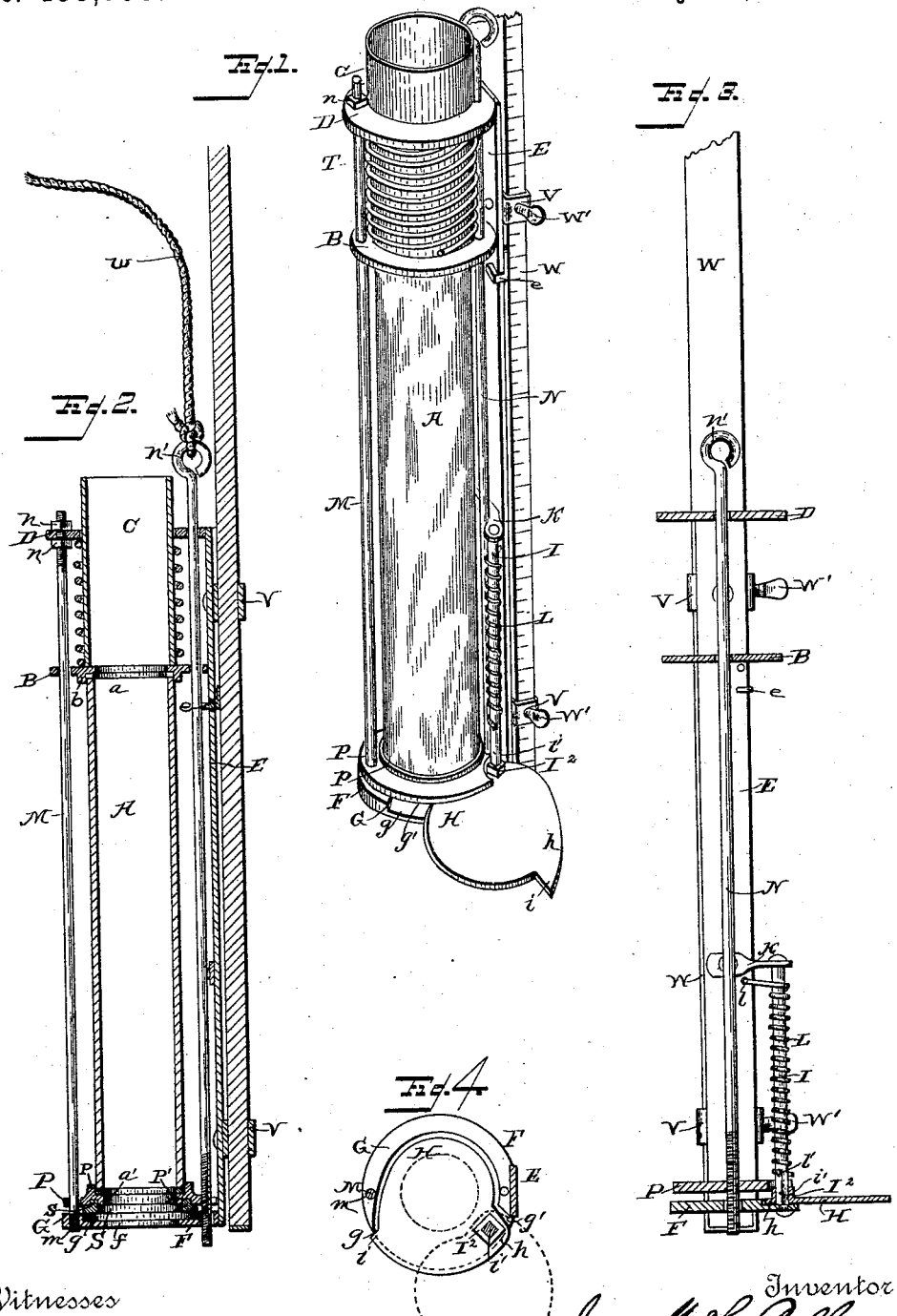

JAMES McL. BELL, OF MILLERSTOWN, PENNSYLVANIA.

LIQUID-TESTER.

SPECIFICATION forming part of Letters Patent No. 455,733, dated July 14, 1891.

Application filed May 2, 1891. Serial No. 391,348. (No model.)

*To all whom it may concern:*

Be it known that I, JAMES McL. BELL, a citizen of the United States, residing at Millerstown, in the county of Butler and State of Pennsylvania, have invented certain new and useful Improvements in Liquid-Testers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of apparatus employed in cutting out and withdrawing samples of fluid from a barrel, tank, or other receptacle for the purpose of examining and testing the quality of the fluid by the inspection of samples taken at any given depth or from several different strata successively. These fluid-testers or "oil-thieves," as they are generally termed, are lowered into the receptacle in which the oil or other fluid is contained in bulk, and at the proper depth the tubular vessel, which is open at both ends when introduced, is closed at its bottom by a valve, trapping a section or body of the fluid representing the color, density, opacity, and purity of the lowest stratum or layer penetrated by the tester or "thief." As the instrument is introduced and sinks in the body of oil or other fluid its tubular body or container is open at both ends in order that the fluid may pass freely through the same without mingling or breaking up the stratification, it being important that the disturbance be reduced to the minimum and that no material portion of any of the upper and lighter strata be carried down and mingled with that from which the sample is taken. It is of the highest importance, also, that the valve at the lower end of the receiver shall be capable of operating at any desired depth to permit the withdrawal of samples from different parts of the same body of fluid, which may by reason of different specific gravities lie in several successive strata, each having a different characteristic appearance. It is essential, moreover, that the valve by which the sample is trapped shall form when seated a practically-tight joint, cutting off all perceptible fluid-escape. This is not only necessary for the sake of cleanliness, but for the further reason that in withdrawing the tester the escape of the heavier trapped fluid will be replaced by an equal portion of the lighter, the presence of which in small quantities even may in some cases destroy or impair the accuracy of the test. It is highly desirable, also, that the tester be of light weight and suitable construction, and that it be stripped as far as possible of numerous projections—such as levers, lateral valve-boxes, and stem-brackets—as each external adjunct produces additional disturbance of the fluid. It should be capable, also, of easy, thorough, and rapid cleansing, and for this purpose the parts should be readily separable.

It is the purpose of my invention to provide a fluid-tester or thief possessing these advantages, and to construct and combine the parts so that the valve shall be held open as the tester is introduced, and shall be closed at any predetermined point and securely packed upon its seat by the automatic action of the same parts by which it is held open.

It is a further purpose of my invention to provide the trade with an instrument of this type which shall be accurate in operation, light and convenient to use, and of extremely simple and comparatively inexpensive construction.

The invention consists in the several novel features of construction and new combinations of parts hereinafter fully set forth, and then more particularly pointed out and defined in the claims which conclude this specification.

To enable others skilled in the art to make, construct, and use my said invention, I will proceed to describe the same in detail, reference being had for such purpose to the accompanying drawings, in which—

Figure 1 is a perspective view of a fluid-tester embodying the invention, the valve being shown as open and the instrument in condition for immediate use. Fig. 2 is a central longitudinal section of the parts shown in Fig. 1, the plane of section being from front to rear. Fig. 3 is a sectional elevation showing the bracket-back, the pole, the valve-releasing rod, the valve, the valve-stem, and their supports. Fig. 4 is a detail section taken transversely through the bracket and valve-stem just above the bottom plate in Fig. 3, the valve being shown in full lines as closed and in dotted lines as open.

The reference-letter A in said drawings indicates the main body of the container, which is usually of cylindrical or tubular form, and is preferably constructed of clear glass to afford ready inspection of the withdrawn sample of fluid. This portion of the container is ordinarily about twelve inches in length and two in diameter; but these proportions may be widely varied. The tubular body is open at both ends and of substantially uniform diameter throughout.

Upon the upper end of the tubular body A rests a gasket or packing-ring $a$, of rubber or other suitable material, flush with the glass, or nearly so, upon both inner and outer surfaces. Upon this gasket is placed an annular plate B, its substantially central circular opening having a diameter which is the same as the interior diameter of the tubular body or thereabout. Upon the lower face of the plate B is found a collar $b$, surrounding the gasket $a$ and dropping below the end of the body A to retain these parts in position and prevent the lateral displacement of the annular plate. From the upper surface of the latter rises a cylinder C, about one-fourth the length of the tubular body A, and usually made of brass or other suitable metal, its interior and exterior diameters corresponding substantially with those of the tubular body A. It is open at both ends, and it may be formed in one piece with the annular plate B or constructed separately and soldered or otherwise secured thereto.

Surrounding the upper portion of the cylinder C is an annular plate D, forming part of a bracket-back E, from which said annular plate extends at a right angle. This bracket-back consists of a strong strip of metal, preferably brass, lying parallel with the tubular body A and extending somewhat beyond its lower extremity, where it is provided with a circular plate F, parallel with the annular plate D and having a substantially central opening $f$ of the same diameter as the body A. Upon the upper surface of the plate is formed a low but broad flange G, having a countersunk space $g$ coextensive with the flange, which, as shown in Fig. 4, is entirely removed from one side of the plate, one end of the flange being tapered to a point by carrying its inner edge out to the periphery of the plate. Upon the flat face $g'$ thus found by the removal of part of the flange G is pivoted a valve having a semi-oval portion H, which seats within the space $g$ and a broader part $h$, lying upon the flat surface $g'$ and having a shoulder $i$, which lies against the point of the flange G when the valve is closed. The valve is located upon a stem I, having pivoted bearings in the plate F, adjacent to the blunt end of the flange G. A square portion $i'$ of the stem engages a similar opening in the valve and in a low flange $i^2$, rising from its upper face. The stem extends upward substantially parallel with the axis of the body A to an arm K, projecting laterally from the bracket-back E and giving pivoted support to the upper end of the stem. A spring L, coiled upon the stem and having one end $l$ fastened to the bracket-back E and its other end inserted in an opening $l'$ in the stem, turns the latter and closes the valve, when the latter is free to move.

Diametrically opposite the bracket-back E, or nearly so, an opening $m$ is found in the annular plate F, having a female thread, in which the threaded end of a rod M is screwed, the rod extending upward parallel with the body A and passing loosely through openings in the annular plates C and D, its upper threaded end projecting somewhat above the latter and receiving two nuts $n$, lying against the opposite faces of the annular plate D. By this construction the otherwise unsupported portion of the plate F is rigidly braced to the annular plate D.

Immediately in front of the bracket-back E is arranged a rod N, which passes loosely down through openings in the annular plates D and B, its lower end, which is threaded for some distance, being screwed through a threaded aperture in an annular plate P (which will be described immediately) and passing downward through an opening in the plate F, below which it extends a short distance. The upper end of the rod usually extends a little above the top of the cylinder C, and is provided with an eye or loop $n'$.

The annulus P is provided with a collar $p$, which closely surrounds the lower end of the tubular body A and incloses a packing-ring or gasket $a'$ seated upon said end. An interior flange $p'$ projects from the bottom of the collar $p$ beneath said gasket. In the lower face of the annulus P, nearly underneath the collar $p$, is cut a channel to receive a rib or collar $s$, forming part of a rubber or other suitable gasket S, which projects outward beneath the lower face of the annulus P. The latter is attached by its construction to the lower end of the tubular body A and rests with the gasket S just above the plate E, the outer edge of the gasket being directly above the inner edge of the flange G.

Coiled upon the cylinder C is a spiral spring T, of suitable strength, its tension being exerted upon the adjacent faces of the annular plates B and D, thereby forcing the tubular body A, with its annulus P and gasket S, downward and pressing the gasket closely against the valve, the gasket seating thereon when the valve is closed and having close contact with its upper face entirely around the same. Practically considered, the lower face of the gasket S is the valve-seat, and the gasket being of rubber or other suitable yielding or elastic material, the joint formed is perfectly tight, and leakage is rendered impossible.

The bracket-back E is provided with loops V, adapted to receive a pole W of any suitable length, its end being pushed down through the lower loop until it lies at such a point that the threaded end of the rod N projects below it or is upon a level therewith or below the end of said rod. The pole is fastened at any desired point by clamping-screws W'.

The operation of the parts described is as follows: The valve being turned into the position shown by dotted lines in Fig. 4, the force exerted by the spiral spring T pressing the gasket S down upon the small marginal portion of the valve near the valve-stem and projecting said gasket somewhat into the countersunk space $g$ holds the valve, and prevents it from closing. The tester being now introduced into the body of fluid and passed to the bottom of the tank, should it be desired to remove a sample from the lowest stratum, the oil or fluid passes quietly through the tubular body A and cylinder C without disturbance or agitation. Upon reaching the bottom of the tank the projecting end of the rod N comes in contact therewith, and by exerting a moderate downward pressure on the pole the said rod is caused to lift the annulus P, raising the tubular body and cylinder C, which rises through the annular plate D. This slight movement compresses the spring T and relieves the pressure on the valve, whereupon the spring coiled on its stem swings it to place. The tester being raised or the pressure on the pole removed the tension of the spring T instantly seats the gasket S on the valve and closes the lower end of the container or tubular body A. In order to provide for testing at points above the bottom, or where the rod N cannot have contact with a rigid support, I attach a cord or wire $w$ to the upper end of the valve-releasing rod, which is then operated from above.

As it is sometimes desirable to take samples at certain distances from the bottom or to ascertain at what distance above the bottom a tested sample was taken, I mark or attach a graduated scale upon the pole. This scale may be placed at any preferred point; but I have shown it applied to one of the sides, as seen in Fig. 1.

Upon the rear face of the bracket-back E is pivoted a small angle-plate $e$, one part of which being bent at right angles with the bracket-back lies in a slot therein, and may be turned in and out of the same. When turned into the slot, it serves to support the annular plate B and cylinder C, while the tubular body A is removed. By turning the angle-plate out of the slot all the parts may readily be removed for cleansing or other purposes.

By this invention I am able to secure the several advantages hereinbefore referred to and provide a tester which is simple, of inexpensive construction, extremely light and easily handled, and which may be cleansed thoroughly in every part with perfect ease in a few moments of time and with little trouble.

Having described my invention and set forth its merits, what I claim is—

1. In a fluid-tester, the combination, with a tubular body having a packing ring or gasket on its lower end, of a spring-closed valve pivoted on a support beneath said tubular body, means for pressing said tubular body downward, and a valve-releasing rod to raise the tubular body and relieve the pressure on the opened valve, substantially as described.

2. In a fluid-tester, the combination, with a tubular body or container having a packing ring or gasket upon its lower end, of a spring-closed valve pivoted on a support beneath the lower end of said tubular body, a vertically-movable valve-releasing rod connected with the tubular body or container and having one end projecting below the valve-support and provided with an eye or loop at the other end, and means for pressing the tubular body and gasket downward, substantially as described.

3. In a fluid-tester, the combination, with a tubular body open at both ends and having an annulus at its lower end provided with a gasket or elastic packing-ring, of a valve pivoted upon a plate beneath and disconnected from the tubular support, a spring to close said valve, a vertically-adjustable rod connected with the annulus, and a spring constantly pressing the tubular body and annulus downward, substantially as described.

4. In a fluid-tester, the combination, with a vertically-movable downward-pressed tubular body having a gasket on its lower open end, of a spring-closed valve pivoted on an independent rigid support beneath the gasket, and means for raising the tubular body to relieve the pressure on the valve, substantially as described.

5. In a fluid-tester, the combination, with a bracket-back having at its upper end an annular plate at right angles with said back and provided at its lower end with an annular plate having a partial flange on its upper face, of a tubular body having a cylinder seated on its upper end, movable in the annular plate and provided with an annulus on its lower end having a gasket, a spring-closed valve pivoted on the flat face of the lower annular plate between the ends of the partial flange, a spring surrounding the cylinder and bearing upon the lower face of the upper annular plate and the upper face of an annular plate between the cylinder and the tubular body, and a valve-releasing rod standing in openings in said annular plates and vertically movable therein, its lower threaded end being screwed through the annulus on the tubular body and passing loosely through the lower annular plate, which is rigidly connected to the upper parallel annular plate by a rod, substantially as described.

In testimony whereof I affix my signature in presence of two witnesses.

JAMES McL. BELL.

Witnesses:
J. C. GAISFORD,
GEO. W. HUSELTON.